(12) United States Patent
Hirota et al.

(10) Patent No.: US 6,612,542 B2
(45) Date of Patent: Sep. 2, 2003

(54) MOTOR OPERATED BUTTERFLY VALVE

(75) Inventors: Hisatoshi Hirota, Tokyo (JP); Masaaki Tonegawa, Tokyo (JP)

(73) Assignee: TGK Co., Ltd., Tokyo (JP)

( * ) Notice: Subject to any disclaimer, the term of this patent is extended or adjusted under 35 U.S.C. 154(b) by 121 days.

(21) Appl. No.: 09/797,431

(22) Filed: Mar. 1, 2001

(65) Prior Publication Data
US 2001/0035513 A1 Nov. 1, 2001

(30) Foreign Application Priority Data
Mar. 28, 2000 (JP) ........................................ 2000-087712

(51) Int. Cl.[7] ............................................... F16K 31/04
(52) U.S. Cl. ..................... 251/129.12; 251/77; 251/180; 137/870; 454/333
(58) Field of Search ............................. 251/77, 129.11, 251/129.12, 129.13, 180; 454/333, 335, 265, 266, 267, 268; 137/870, 871, 876

(56) References Cited

U.S. PATENT DOCUMENTS

| 3,911,953 A | * | 10/1975 | Crombie et al. ........... 251/77 X |
| 3,994,335 A | * | 11/1976 | Perkins ..................... 251/77 X |
| 4,981,283 A | | 1/1991 | Bradshaw et al. ..... 251/129.11 |
| 5,096,156 A | * | 3/1992 | Wylie et al. .................. 251/77 |
| 5,255,891 A | * | 10/1993 | Pearson et al. ........ 251/129.11 |
| 5,934,994 A | * | 8/1999 | Wylie et al. ........ 251/129.11 X |
| 5,937,891 A | | 8/1999 | Scoccia ..................... 137/351 |

* cited by examiner

*Primary Examiner*—Gene Mancene
*Assistant Examiner*—Eric Keasel
(74) *Attorney, Agent, or Firm*—Patterson, Thuente, Skaar & Christensen, L.L.C.

(57) ABSTRACT

A motor operated butterfly valve arrangement, at least one valve element of which is to be brought into a proper extreme position such that water leakage or the like does not occur within the pipe controlled by the valve element, without the necessity to improve dimensional or mounting accuracy of the components and without the need to lock the motor actuating the valve element. An elastically deformable elastic coupling member is provided in a coupling mechanism interconnecting the motor and the valve element. As soon as the valve element reaches the desired extreme position in contact with a stopper, the motor is rotated to deform the elastic coupling member and to improve the contact between the valve element and the stopper. The motor is stopped in the deformed state of the elastic coupling member.

18 Claims, 3 Drawing Sheets

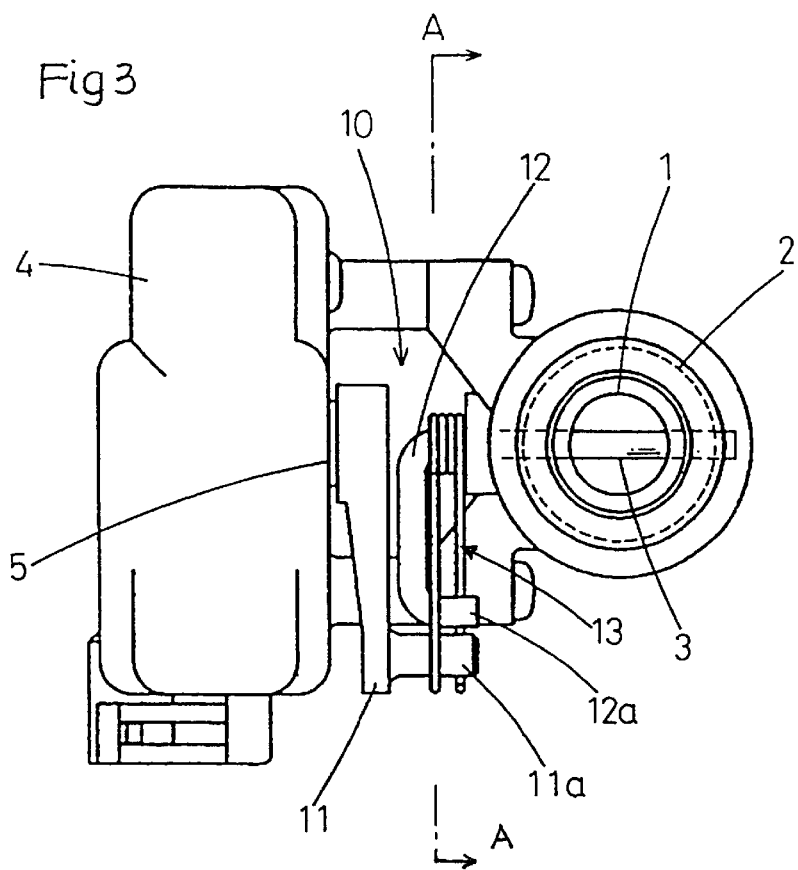
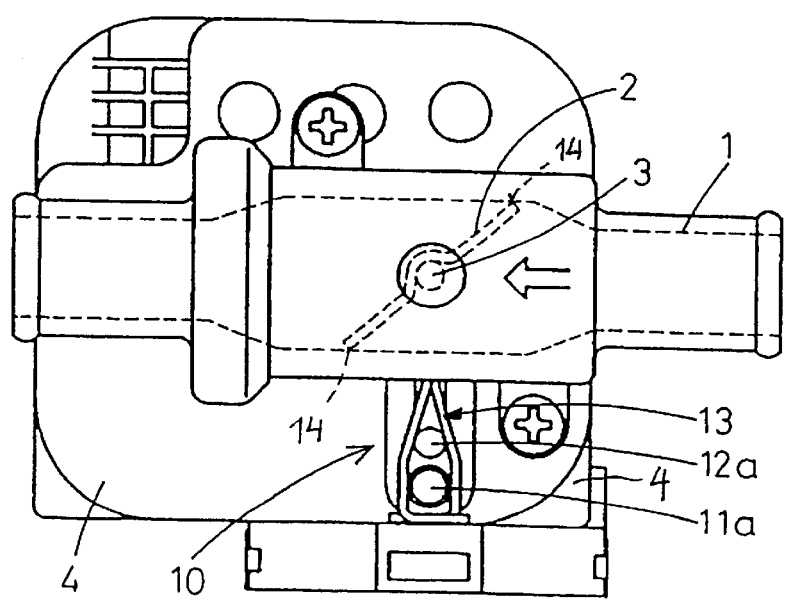

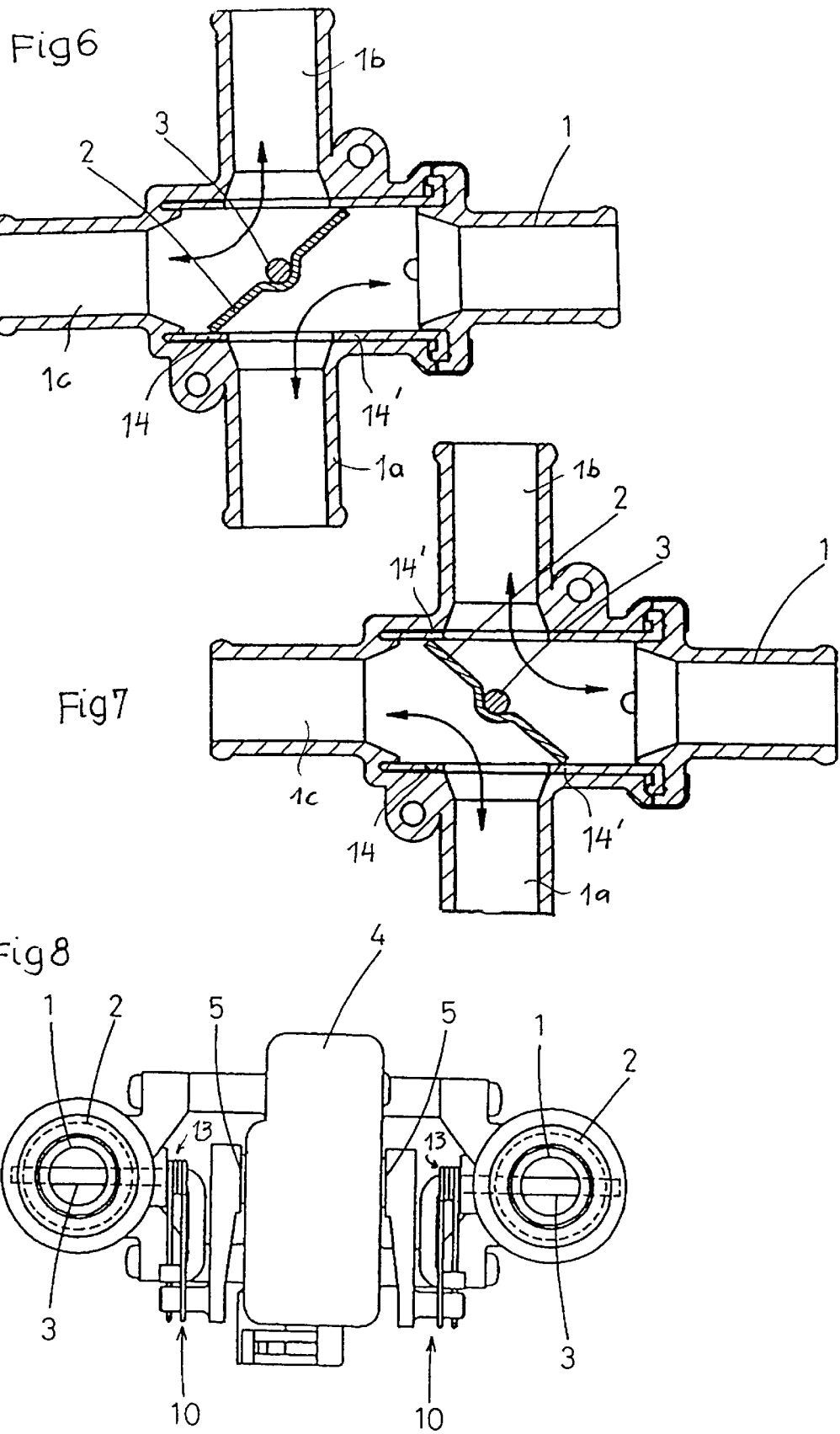

MOTOR OPERATED BUTTERFLY VALVE

BACKGROUND OF THE INVENTION

The present invention relates to a motor operated butterfly valve arrangement for controlling the opening state of at least one pipe, comprising at least one valve element movably arranged within the pipe, a motor, and a coupling mechanism between the motor, and the valve element in order to vary the orientation of the valve element in relation to the pipe between different opening states with differing orientations of the valve element. At least one of the opening states is defined by mechanical contact between the valve element and a stopper of the pipe. The invention relates to a motor operated butterfly valve having a valve element arranged within a pipe. The valve element has an orientation thereof varied through operation of a motor to control an opening state of the pipe.

Motor operated butterfly valves can be used for controlling the opening/closing/switching, etc. of hot water piping in an automobile air-conditioner, for example. Generally the orientation of a least one disk-shaped valve element provided inside a pipe is varied by the driving force of a motor to control the opening state of the pipe.

In practice, motor operated butterfly valves are controlled such that the motor simply is stopped at, e.g. an extreme stop position of the valve element. This can be the fully closed position at which the pipe is fully closed. A satisfactory fully closed state often cannot be achieved due to unavoidable errors attributable to dimensional accuracy and mounting accuracy of the components. If the extreme stop position is the fully closed position, then water may still leak through. If the extreme stop position is the fully opened position, said valve element may cause an undesirable flow throttling effect.

In practice it is known to overcome said problems by locking the motor in a state when the valve element remains loaded in its closing direction even at the fully closed position in order to intentionally press said valve element into its fully closed position. This is however, not desirable in view to the durability of the motor.

There are butterfly valve arrangements comprising a plurality of valve elements collectively controlled in parallel with each other. Even if said valve elements are driven to carry out exactly the same opening and closing motions, the respectively achievable opening or closing states may slightly differ among the valve elements due to errors attributable to dimensional accuracy, mounting accuracy, differing slacks in the driving mechanism, etc. Accordingly, in such cases for safety sake for each valve element an own motor is to be provided. This is uneconomical since the cost of parts are high and the mounting space is excessively large.

OBJECT AND SUMMARY OF THE INVENTION

It is an object of the present invention to provide a motor operated butterfly valve arrangement or butterfly valve, the valve element of which can be brought to a proper stop state at an extreme stop position such that no water leak or the like can occur, and without the need to improve the dimensional accuracy or mounting accuracy of individual components, and also without the need to lock the motor.

The object of the invention is achieved by a motor operated butterfly valve arrangement for controlling the opening state of at least one pipe, having at least one valve element movably arranged within the pipe, a motor, and a coupling mechanism between the motor and the valve element in order to vary the orientation of the valve element in relation to the pipe between different opening states with differing orientations of the valve element. At least one of the opening states is defined by mechanical contact between the valve element and a stopper of the pipe. The coupling mechanism includes an elastic coupling member for elastically taking up by deformation an extra driving motion increment of the motor in relation to the valve element as soon as the valve element is stopped at the stopper, the extra driving motion increment continuing the former motor driving motion.

The motor operated butterfly valve has a valve element arranged within a pipe. The valve element has an orientation thereof varied through operation of a motor to control an opening state of the pipe wherein a driving arm rotated by the motor and a driven arm coupled to the valve element are elastically coupled to each other by an elastic coupling member, the motor being controlled to bring the valve element to a stopped state in contact with a stopper at least one extreme stop position thereof. The motor is controlled further on to rotate the driving arm extra after the valve element comes into contact with the stopper and the motor first is stopped after having fulfilled the extra rotation.

According to the present invention in general the motor carries out an extra driving motion increment as soon as said valve element has reached its extreme position, and then the motor is stopped without being locked. In accordance with a further aspect of the invention the driving arm transmitting the driving motion of said motor via said coupling mechanism containing said elastic coupling member is rotated an extra amount by the motor after the valve element has come into contact with the stopper at the predetermined extreme stop position thereof. After said extra rotation, said motor is stopped. The valve element and the driven arm coupled to said valve element remain stopped while the elastic coupling member elastically coupling the driving arm and the driven arm is elastically deformed by the driving force of the motor and the extra rotation thereof, with the result that the elasticity of the coupling member serves to press said valve element firmly against the stopper, and to keep it in a pressed condition. The reaction force of the deformed elastic coupling member can be set weak enough to avoid locking the motor. Accordingly, even if there is a dimensional error, mounting error or the like among the individual components, the valve element can be brought to a proper stop state such that water leakage or the like cannot occur and without the need to lock the motor.

Resulting from the elastic coupling member provided in said coupling mechanism, the coupling mechanism is designed with a restraint lost motion feature, allowing said elastic coupling member to generate a load pressing said valve element into its extreme position by an extra driving motion increment of said motor in continuation of the former driving motion and for a limited extent. Since there is no rigid connection between the motor and the valve element, the motor can be stopped normally after carrying out this extra driving motion increment, without the need to lock it. Said elastic coupling member takes up the extra driving motion increment and generates the desirable pressing force of the valve element. Due to said elastic pressing force, the valve element reaches its extreme position precisely and reliably irrespective of mounting or dimension tolerances, because it is dragged by said elastic coupling member into the correct extreme stopping position. Said extra driving motion increment caused by the motor is of a larger magnitude than needed. This establishes a broad safety margin within which the valve element reliably can be brought into the desired extreme position without the necessity to lock the motor, because the reaction force on the motor can be weak.

In a preferred embodiment, said valve element may have two different extreme positions each defined by a respective stopper. Said elastic coupling member is acting bi-directionally, i.e. generates its lost motion feature in both driving directions of the motor.

Expediently said elastic coupling member is storing the driving power by elastic deformation and is generating an increased contact pressure between the valve element and its stopper. Said contact pressure may be lower than the driving force or driving torque of the motor.

In another embodiment, a single motor is coupled with a plurality of valve elements via a number of elastic coupling members equal to the number of said valve elements. When said motor has carried out its extra driving motion increment after at least one of said valve elements is contacting its respective stopper, all valve elements coupled to said common motor will be reliably brought in their extreme stop positions. Each elastic coupling member then might be deformed different from another depending on the individual tolerance which has been compensated for.

The elastic coupling member may be a spring member engaging with both the driving arm and the driven arm. As soon as the valve element is in contact with the stopper and the driving arm is rotated extra by the motor, the driven arm and the valve element will remain stopped in the correct extreme position while the elastic coupling member is elastically deformed. The magnitude of the extra rotation of said motor has to be set to a value which reliably covers at least the possible tolerances of said valve element and any slacks within the force transmission path between the motor and the valve element.

In an expedient embodiment, the elastic spring member is a coil spring having a forked portion for holding both arms or lateral pins of both arms. As soon as the driving arm is rotated an extra amount by the motor after the valve element contacts the stopper, the elastic spring member is elastically deformed such that a gap defined by said forked portion is widened. Said forked portion design of said spring member is advantageous because said spring member can act in both moving directions of said valve element.

Said extreme stop position of the valve element may be the position at which the pipe is fully closed. Only then said elastic coupling member is deformed to take up the extra driving motion increment of said motor. In the other extreme position of the valve element, which can be the fully opened position, the motor may stop normally without carrying out any extra driving motion.

In an alternative embodiment the pipe may be a branching pipe. The valve element is located at the location of the branch function. The orientation of the valve element can be varied to alternately interconnect two branch pipes of four branch pipes or to interconnect all branch pipes. Two extreme stop positions of said valve elements can be provided where alternatively two respective branch pipes are fully interconnected. In each extreme position, the motor is rotated extra as soon as the valve element has contacted its stopper. It suffices to provide only one elastic coupling member, which is acting bi-directionally.

In another embodiment, there may be a plurality of valve elements in parallel with each other, driven by a common single motor. An elastic coupling member is provided between each of the driven arms of the plurality of valve elements and the motor. There might even be the same number of driving arms as driven arms. If there are deviations among the respective extreme positions of the valve elements because of errors attributable to dimensional accuracy, mounting accuracy, slack in the transmission, etc., the respective elastic coupling element is compensating for said differences automatically when said motor has been rotated an extra amount after at least one of said valve elements has contacted its stopper. The elastic coupling element of each valve element ensures that the orientations of all valve elements may be controlled collectively by the single motor, and that each valve element reliably reaches its extreme position even if the extreme positions slightly differ from one another.

In order to save mounting space and to avoid power losses during the transmission of the driving force of the motor, the output shaft and the valve element shaft ought to be arranged axially with the driving and driven arms essentially parallel to each other, and the elastic spring member coupling both arms via respective lateral pins. The elastic spring member defining said elastic coupling member can be carried either by the valve element shaft or by the motor output shaft, respectively. If the active lever arm of the driven arm is shorter than the active lever arm of the driving arm, said elastic coupling member can even increase the actuation force for the valve element. In order to achieve a predetermined actuating force a low torque motor can be used. In this case, the swivelling stroke of the driving arm is larger than the swivelling stroke of the driven arm. The arrangement can be inversed as well, in order to achieve a relatively enlarged swivelling stroke for the valve element compared to a shorter swivelling stroke or rotation of the motor and the driving arm. In the first mentioned arrangement, the reaction torque of the deformed elastic coupling member is weaker for the motor than the torque keeping the valve element in contact with its stopper.

BRIEF DESCRIPTION OF THE DRAWINGS

Embodiments of the invention will be explained with the help of the drawings. In the drawings:

FIG. 3 is a view of the motor operated butterfly valve of FIGS. 1 and 2 in the direction of the axis of a pipe, FIG. 4 is a front view of said motor operated butterfly valve arrangement, FIG. 6 is a sectional view of a second embodiment of a motor operated butterfly valve arrangement in a first operation state, FIG. 7 is a sectional view of a second embodiment of a motor operated butterfly valve arrangement in a second operation state, and FIG. 8 is a front view of a third embodiment of a motor operated butterfly valve arrangement.

DESCRIPTION OF THE PREFERRED EMBODIMENTS

Figure 1:
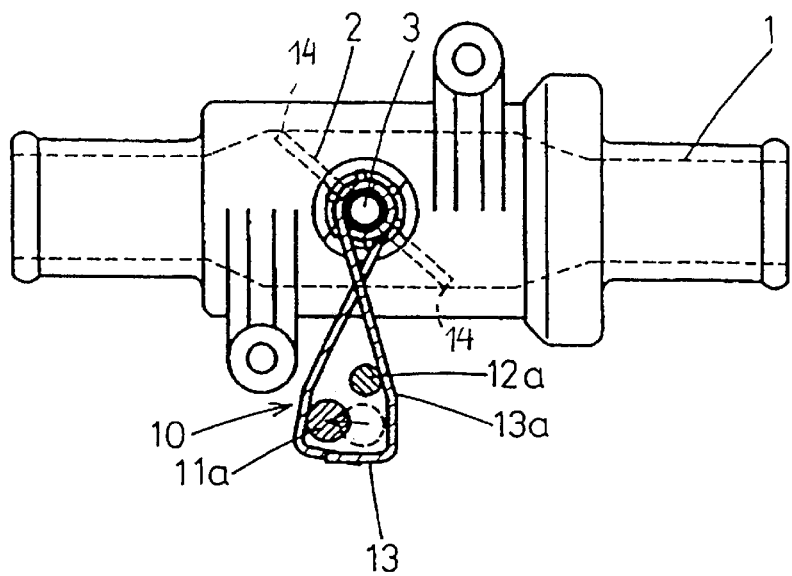
FIG. 1 is a sectional view of a first embodiment of a motor operated butterfly valve arrangement, showing a fully closed state (sectional plane a—a in FIG. 3)

FIGS. 1 to 4 illustrate a first embodiment of a motor operated butterfly valve arrangement, e.g. used for opening/ closing etc. of a hot water pipe in an automobile airconditioner. Such an arrangement, however, can be used for controlling the opening states of various other types of fluid pipes as well.

A disk-shaped butterfly valve element 2 for controlling the opening state of a pipe 1 is arranged midway in pipe 1 and is rotatable about a shaft 3 extending across pipe 1. Butterfly valve element 2 is securely fixed to shaft 3 and is driven by an actuator, e.g. an electric motor 4 rotating shaft 3. Shaft 3 varies the relative orientation of butterfly valve element 2 within pipe 1. Actuator 4 may be a motor actuator, a stepping motor or the like, i.e. an actuator the stop angle of which can be set.

An output shaft 5 of motor 4 and shaft 3 are in mutual alignment, i.e. at least substantially coaxial with respect to each other. Output shaft 5 and shaft 3 are not directly coupled, but are coupled to each other by a coupling mechanism 10. Coupling mechanism 10 includes a driving arm 11 directly coupled to output shaft 5, a driven arm 12 directly coupled to shaft 3, and an elastic coupling member 13 for elastically coupling driving arm 11 to driven arm 12. In the embodiment shown, elastic coupling member 13 is formed as a spring member.

Driving arm 11 and driven arm 12 extend in directions substantially perpendicular to the respective rotary shafts 3, 5. At distal ends of driving arm 11 and driven arm 12, sidewardly protruding driving pins 11a, 12a are provided. Both driving pins 11a, 12a are positioned adjacent to one another and are elastically coupled by elastic coupling member 13.

Figure 2:
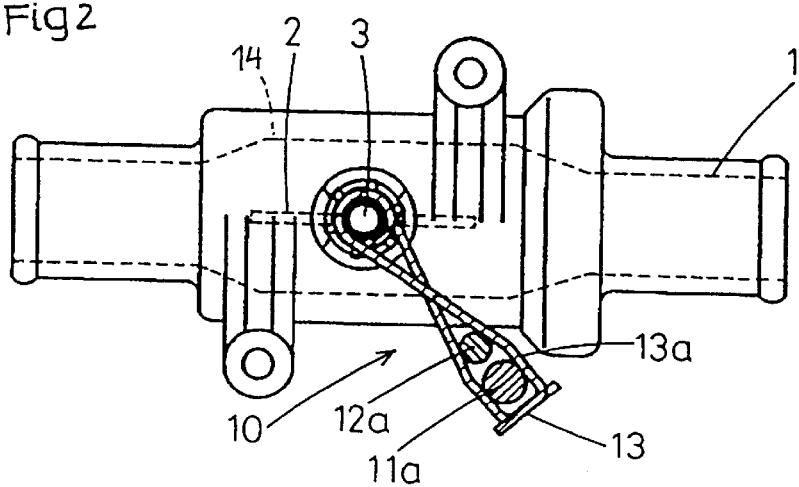
FIG. 2 is a sectional view of the motor operated butterfly valve arrangement of FIG. 1, showing a wide open state.

FIG. 1 illustrates a fully closed state in which pipe 1 is completely closed by butterfly valve element 2. The inner wall of pipe 1 defines a stopper 14 defining the extreme position of valve element 2 in the closed state. Instead, a not shown structural stopper could be provided inside pipe 1 for sealing co-action with valve element 2. Alternatively, a stopper could even co-act with shaft 3 to define at least one extreme position of valve element 2. FIG. 2 illustrates a wide open state in which the orientation of valve element 2 at least substantially coincides with the axial direction of pipe 1.

Figure 5:
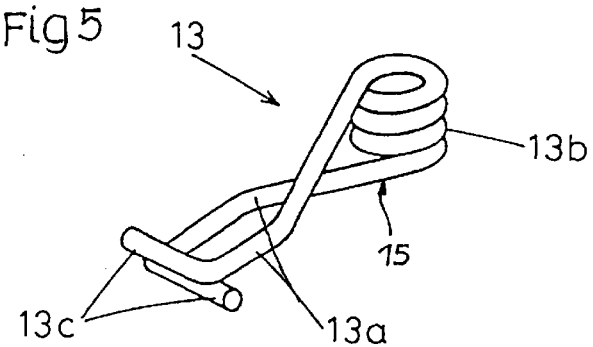
FIG. 5 is a perspective view of an elastic coupling member designed as a spring member as used in the first embodiment.

Elastic coupling member 13 in FIG. 5 is a coil spring 15 having a coiled portion 13b consisting of several spring windings. At the ends of said coiled portion 13b, two mutually crossing legs extend essentially perpendicular to the axis of coiled portion 13b. Both legs define a forked portion 13a for holding driving pin 11a and driven pin 12a therein. Distal end portions 13c of both legs are bent to close said forked portion 13a. Coiled portion 13b surrounds an end portion of shaft 3 such that both legs of elastic coupling member 13 extend essentially parallel to arms 11, 12. The radial distance of driven pin 12a from shaft 3 is shorter than the radial distance of driving pin 11a from output shaft 5. The diameter of driving pin 11a is somewhat bigger than the diameter of driven pin 12a such that normally both pins 11a, 12a are held by both legs and from opposite sides in forked portion 13a.

In a normal state, i.e. as long as valve element 2 does not contact stopper 14 or contacts stopper 14 without significant contact pressure, the forked portion 13a of elastic coupling member 13 firmly holds pins 11a, 12a as shown in FIG. 2, such that both pins may not move in relation to each other and in relation to the forked portion.

Accordingly, as soon as driving arm 11 is rotated by motor 4, driven arm 12 coupled to driving arm 11 by elastic coupling member 13 is rotated together with driving arm 11 without any delay such that e.g. the orientation of butterfly valve element 2 can be changed around the wide opened state, e.g. as shown in FIG. 2.

However, as soon as valve element 2 is brought to the fully closed state of FIG. 1, it contacts the inner pipe wall or stopper 14 of pipe 1 in order to close pipe 1. Then, driving arm 11 is rotated an extra amount after valve element 2 contacts stopper 14 over an extra driving motion increment of motor 4. Said extra driving motion increment of motor 4 continues in the same direction as the former movement towards said closed state for a predetermined extent. Then motor 4 is stopped.

In the fully closed state, therefore, after driven pin 12a of driven arm 12 stops with butterfly valve element 2 kept in contact with the inner wall or stopper 14 of pipe 1, driving pin 11a of driving arm 11 is rotated an extra amount so that elastic coupling member 13 is brought to a state in which the forked portion 13a is elastically deformed in its widening direction, as shown in FIG. 1. In other words, by said extra rotation of motor 4, pins 11a, 12a spread apart both legs of the coil spring 15 and change the dimension of forked portion 13a from a first dimension to a second, larger dimension. In this situation, driving pin 11a is contacting only one leg, while driven pin 12a is contacting only the other leg. The extra rotation or extra driving motion increment of motor 4 in the shown embodiment equals essentially an angular motion e.g. corresponding substantially to the diameter of driving pin 11a.

As a result, the spring force of deformed elastic coupling member 13 acts such that butterfly valve element 2 is pressed against the inner wall or stopper 14 of pipe 1, and, accordingly, even if there is a dimensional error or mounting error in the individual parts, a satisfactory fully closed state can be achieved.

In the second embodiment as shown in FIGS. 6 and 7, pipe 1 may be a branching pipe branching at the location of butterfly valve element 2 into three branch pipes 1a, 1b, 1c. All four branch pipes 1, 1a, 1b, 1c are oriented with an offset of about 90° with respect to one another. Butterfly valve element 2 carried by shaft 3 serves to switch between different communication modes. In FIG. 6, pipe 1 is communicating with branch pipe 1a while simultaneously branch pipe 1b is communicating with branch pipe 1c. Communication from pipe 1 to branch pipes 1b and 1c are blocked, as well the communication from branch pipe 1c to branch pipe 1a. In FIG. 7, pipe 1 is connected to branch pipe 1b, while simultaneously branch pipes 1c and 1a are interconnected. There might even be a further communication state in which valve element 2 is oriented parallel to the axis of pipe 1, such that all pipes and branch pipes are communicating with one another. Two extreme positions of butterfly valve element 2 are defined by stoppers 14, 14', e.g. the inner walls of pipe 1. At each of said extreme positions of valve element 2, elastic coupling member 13 is elastically deformed as shown and explained in connection with FIG. 1. In this case, elastic coupling member 13 is acting bi-directionally. In FIG. 6, the not shown motor is rotated an extra amount in the anticlockwise direction as soon as valve element 2 contacts stopper 14. In FIG. 7, the not shown motor is rotated an extra amount in the clockwise direction as soon as valve element 2 contacts stopper 14' or the inner wall of pipe 1.

In the further embodiment of FIG. 8, a single motor 4 is used to drive at least two butterfly valve elements 2 collectively. Output shafts 5 may be provided on opposite sides of motor 4. Each output shaft is coupled to a respective shaft carrying a valve element 2 in a pipe 3 via a coupling mechanism 10 including its own elastic coupling element 13. Even in cases where there is difference between the angular position at which the two butterfly valve elements 2 are in their fully closed states, both butterfly valve elements 2 can be simultaneously brought to their fully closed states without failures. In a further, not shown embodiment, a single driving shaft of a single motor 4 could be used to drive a series of valve elements which are to be controlled in parallel, each via its own elastic coupling member operating as described above.

What is claimed is:

1. A motor operated butterfly valve having a valve element arranged within a pipe, said valve element having an orientation thereof varied through operation of a motor to control the degree of an opening state of said pipe, wherein a driving arm rotated by said motor and a driven arm coupled to said valve element are elastically coupled to each other by an elastic coupling member, said elastic coupling member being elastically deformable in both driving directions of said motor, said motor being controlled to bring said valve element to a stopped state in contact with a stopper at at least one extreme stop position thereof, said motor being controlled to further rotate said driving arm an extra amount after said valve element contacts said stopper, and wherein said motor has an output shaft carrying said driving arm, said driving arm extending substantially perpendicular to said output shaft, said valve element being situated on a second shaft arranged at least substantially coaxially with said output shaft and carrying said driven arm, said driven arm extending substantially perpendicular to said second shaft, wherein both said driving arm and said driven arm remain substantially parallel and adjacent to each other until said valve element contacts a stopper.

2. The motor operated butterfly valve as in claim 1, wherein said elastic coupling member comprises a spring member engaging both the driving arm and the driven arm, said elastic coupling member being elastically deformed when said driving arm is rotated said extra amount by said motor after said valve element contacts said stopper.

3. The motor operated butterfly valve as in claim 1, further comprising a plurality of valve elements and a plurality of driven arms, wherein a plurality of driving arms are arranged to be rotated by a single motor; wherein each driving arm is elastically coupled to a corresponding driven arm by a respective elastic coupling member; and wherein said single motor collectively controls the orientation of each of said valve elements.

4. The motor operated butterfly valve as in claim 1, wherein said valve element opens and closes said pipe, and one of said at least one extreme stop positions being a position at which said pipe is fully closed.

5. The motor operated butterfly valve as in claim 1, wherein said pipe comprises a branching pipe branching at the location of said valve element into a plurality of branch pipes.

6. The motor operated butterfly valve as in claim 5, wherein said driving arm is rotated said extra amount in a first direction after said valve element contacts a stopper at a first extreme stop position; and wherein said driving arm is rotated an extra amount in a second direction after said valve element contacts a stopper at a second extreme stop position.

7. The motor operated butterfly valve as in claim 5, wherein said pipe is closed to at least one of said branch pipes at each extreme stop position.

8. The motor operated butterfly valve as in claim 7, wherein said driving arm is rotated said extra amount after said valve element contacts a stopper at each extreme stop position.

9. A motor operated butterfly valve arrangement for controlling degrees of an opening state of at least one pipe, comprising at least one valve element movably arranged within said at least one pipe, a motor, and a coupling mechanism between said motor and said at least one valve element, in order to vary the orientation of said at least one valve element in relation to said at least one pipe between different degrees of said opening state with differing orientations of said at least one valve element, at least one of said degrees of said opening state being defined by mechanical contact between said at least one valve element and at least one stopper of said at least one pipe, wherein said motor has an output shaft carrying a driving arm, said driving arm extending substantially perpendicular to said output shaft, said valve element being situated on a second shaft arranged at least substantially coaxially with said output shaft and carrying a driven arm, said driven arm extending substantially perpendicular to said second shaft, wherein both said driving arm and said driven arm remain substantially parallel and adjacent to each other until said valve element contacts a stopper, and wherein said coupling mechanism includes an elastic coupling member for elastically taking up by deformation an extra driving motion increment of said motor in relation to said at least one valve element when said at least one valve element contacts said at least one stopper, said extra driving motion increment continuing in the former motor driving direction, wherein said degrees of said opening state of said at least one pipe include:

a fully opened state of said at least one valve element, and a fully closed state of said at least one valve element defined by said at least one stopper, said elastic coupling member being elastically deformable in both driving directions of said motor, for taking up an extra driving motion increment of said motor in each driving direction.

10. A motor operated butterfly valve having a valve element arranged within a pipe, said valve element having an orientation thereof varied through operation of a motor to control the degree of an opening state of said pipe, wherein a driving arm rotated by said motor and a driven arm coupled to said valve element are elastically coupled to each other by an elastic coupling member, said motor being controlled to bring said valve element to a stopped state in contact with a stopper at at least one extreme stop position thereof, said motor being controlled to further rotate said driving arm an extra amount after said valve element comes into contact with said stopper, wherein said elastic coupling member comprises a spring member engaging both the driving arm and the driven arm, said elastic coupling member being elastically deformed when said driving arm is rotated said extra amount by said motor after said valve element contacts said stopper, with said driven arm and said valve element remaining stopped, wherein said spring member has a forked portion defining a gap of a first predetermined dimension for holding both the driving arm and the driven arm therein, said elastic spring member is brought to an elastically deformed state such that said gap of the forked portion is widened to a larger second dimension by rotating said driving arm said extra amount by said motor after said valve element contacts said stopper.

11. The motor operated butterfly valve as in claim 10, wherein said motor has an output shaft carrying said driving arm, said driving arm extending substantially perpendicular to said output shaft, said valve element being situated on a second shaft arranged at least substantially coaxially with said output shaft and carrying said driven arm, said driven arm extending substantially perpendicular to said second shaft, wherein both said driving arm and said driven arm remain substantially parallel and adjacent to each other until said valve element contacts a stopper.

12. The motor operated butterfly valve as in claim 11, wherein said driving arm and said driven arm each include a respective lateral pin; said elastic coupling member comprises a coiled spring having a coiled portion and two coextensive legs defining said forked portion, said coiled portion being carried by one of said shafts; wherein said coextensive legs extend essentially parallel to said driving and driven arms, and said forked portion surrounds said lateral pins from opposite sides; and wherein said legs spread apart from each other upon said extra rotation of said motor after said valve element contacts a stopper.

13. A motor operated butterfly valve arrangement for controlling degrees of an opening state of at least one pipe, comprising at least one valve element movably arranged within said at least one pipe, a motor, and a coupling mechanism between said motor and said at least one valve element, in order to vary the orientation of said at least one valve element in relation to said at least one pipe between different degrees of said opening state with differing orientations of said at least one valve element, at least one of said degrees of said opening state being defined by mechanical contact between said at least one valve element and at least one stopper of said at least one pipe, wherein said motor has an output shaft carrying a driving arm, said driving arm extending substantially perpendicular to said output shaft, said valve element being situated on a second shaft arranged at least substantially coaxially with said output shaft and carrying a driven arm, said driven arm extending-substantially perpendicular to said second shaft, wherein both said driving arm and said driven arm remain substantially parallel and adjacent to each other until said valve element contacts a stopper, and wherein said coupling mechanism includes an elastic coupling member having a plurality of coextensive legs defining a forked portion, said elastic coupling member elastically taking up by deformation an extra driving motion increment of said motor in relation to said at least one valve element when said at least one valve element contacts said at least one stopper.

14. The motor operated butterfly valve arrangement as in claim 13, wherein said elastic coupling member is a driving power storing member for storing driving power of said motor resulting from said extra driving motion increment when said at least one valve element contacts said at least one stopper, said elastic coupling member generating an increased contact pressure between said at least one valve element and the respective at least one stopper.

15. The motor operated butterfly valve arrangement as in claim 13, wherein a common motor is coupled with each of a plurality of valve elements by respective elastic coupling members, said common motor being controlled to fulfill an extra driving motion increment when at least one of said valve elements contacts its respective at least one stopper.

16. The motor operated butterfly valve as in claim 13, wherein said at least one valve element opens and closes said at least one pipe, and wherein an extreme stop position of said at least one valve element defines a position at which said at least one pipe is fully closed.

17. The motor operated butterfly valve as in claim 13, wherein said at least one pipe comprises a branching pipe branching at the location of said at least one valve element into several pipe branches.

18. The motor operated butterfly valve as in claim 13, wherein a plurality of valve elements are each coupled to a single motor by a respective elastic coupling member, said plurality of valve elements having orientations thereof controlled collectively by said single motor.

* * * * *